United States Patent

Marshall

[15] 3,687,491

[45] Aug. 29, 1972

[54] HOSE COUPLING

[72] Inventor: Don J. Marshall, Edgewater, Md.

[73] Assignee: Goodall Semi-Metallic Hose & Mfg. Co., Philadelphia, Pa.

[22] Filed: Jan. 6, 1970

[21] Appl. No.: 958

[52] U.S. Cl.................................285/242, 285/371
[51] Int. Cl..............................................F16l 33/02
[58] Field of Search......285/242, 248, 244, 256, 255, 285/259, 249, 252, 254, 371, 398, 243, 257, 373, 419, 174, 149; 277/217, 157

[56] References Cited

UNITED STATES PATENTS

| | | | |
|---|---|---|---|
| 493,316 | 3/1893 | Townsend | 285/174 |
| 2,470,373 | 5/1949 | Sayers | 285/242 X |
| 2,086,703 | 7/1937 | Eastman | 285/259 X |
| 2,446,599 | 8/1948 | Knaggs | 285/259 X |
| 3,078,109 | 2/1963 | Jackson et al. | 285/259 X |
| 3,347,571 | 10/1967 | New | 285/256 X |
| 3,454,290 | 7/1969 | Tairraz | 285/249 |

FOREIGN PATENTS OR APPLICATIONS

| | | |
|---|---|---|
| 686,275 | 1/1953 | Great Britain..........285/334.5 |
| 1,453,647 | 8/1966 | France......................285/249 |
| 1,075,106 | 4/1954 | France......................285/248 |
| 1,252,485 | 10/1967 | Germany...................285/248 |

*Primary Examiner*—David J. Williamowsky
*Assistant Examiner*—Wayne L. Shedd
*Attorney*—William J. Dick

[57] ABSTRACT

This Patent discloses a hose coupling including a nipple for insertion into a hose, the nipple having circumferentially extending recesses including leading and trailing ramp portions having roughened or serrated surfaces thereon. After insertion of the nipple into the hose, a segmented collar having circumferentially extending projections on the interior thereof, including leading and trailing ramp portions having roughened or serrated surfaces thereon, is positioned to circumscribe the nipple and overlie and press the hose into the recesses. In order to retain or prevent radial disengagement of the collar from the hose, a retaining ferrule is positioned circumferentially of the collar.

13 Claims, 3 Drawing Figures

PATENTED AUG 29 1972 3,687,491

INVENTOR
DON J. MARSHALL

BY *William J Dick*
ATTORNEY

HOSE COUPLING

SUMMARY OF THE INVENTION AND STATE OF THE PRIOR ART

The present invention relates to hose couplings, and more particularly relates to a self-tightening hose coupling in which, upon an increase in hydraulic pressure occurring interiorly of the hose, relative motion is effected between parts of the coupling causing a self-tightening action thereby preventing blow-off and separation of the hose from the coupling.

The art is replete with couplings for attaching fittings to the ends of flexible hose, for the most part the couplings being of a type which are initially clamped or applied by an external force and requiring special tools. This type of coupling, after being in service, loses its gripping action on the hose due to high stress concentrations which tend to separate the fibers in the hose causing premature failure due to fatigue. Additionally, regardless of the tightness of the fit, such couplings tend to concentrate the stress axially of the hose so that shear occurs in the hose fibers upon stress conditions occurring. Another problem with high pressure couplings of the afore-mentioned type is the occurrence of cold flow of the elastomeric material (usually rubber) at the coupling, which cold flow weakens the strength of the attachment between the coupling and the hose.

In view of the above, it is a principal object of the present invention to provide a coupling for hose, which coupling is self-tightening; that is upon an increase in hydraulic pressure interiorly of the hose, the coupling automatically tightens causing an increase in the gripping action of the hose on the coupling.

Another object of the present invention is to provide a coupling for hose which does not have to be swaged to effect a tight gripping of the hose to the coupling.

Still another object of the present invention is to provide a hose coupling which may be easily assembled without special tools so as to permit ease of assembly by persons in the field.

Still another object of the present invention it to provide a coupling in which the gripping action against the hose is in a large part in compression, that is the hose wall attached to the coupling is preferably predominately under compression as opposed to shear such as is evident in hose couplings of the prior art types.

Other objects and a fuller understanding of the invention may be had by referring to the following specification and claims taken in conjunction with the accompanying drawings in which:

Figure 1:
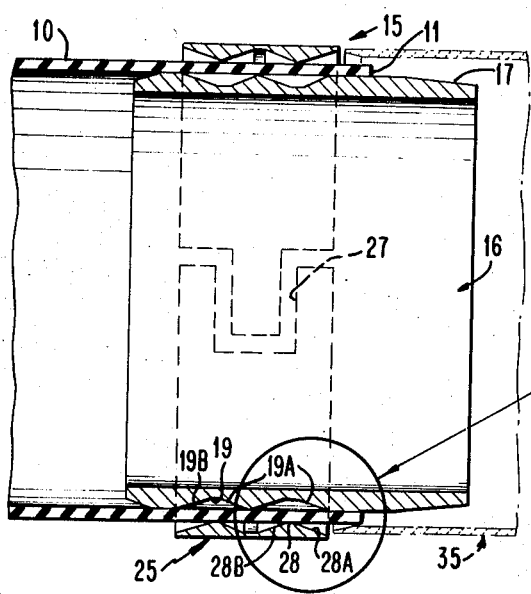
FIG. 1 is a fragmentary sectional view of a hose and coupling constructed in accordance with the present invention just prior to attachment.

Referring now to the drawings, and specifically FIG. 1 thereof, a hose 10, which may be composed of re-enforced elastomeric material such as rubber, and having a terminal end 11 is shown positioned for engagement by a novel self-tightening coupling 15 of the present invention.

In accordance with the invention, the coupling 15 is easily assembled without special tools and provides, in conjunction with the hose 10, a self-tightening effect upon the application of hydraulic pressure to the hose. To this end, the coupling 15 includes a nipple 16 which is insertable into the hose 10, the nipple having a tapered forward portion 17 which may include threads 18 thereon for engagement by a threaded nozzle or another coupling. The nipple 16 includes a plurality of circumferentially extending recesses 19 including leading and trailing ramp portions 19A and 19B respectively, each preferably containing roughened or serrated surfaces 20 thereon, the purposes for which will be more fully explained hereinafter. As shown in the drawing, the nipple should have an outside diameter substantially the same size as that of the hose, preferably such that a force-fit between the nipple and hose is necessary.

Figure 2:
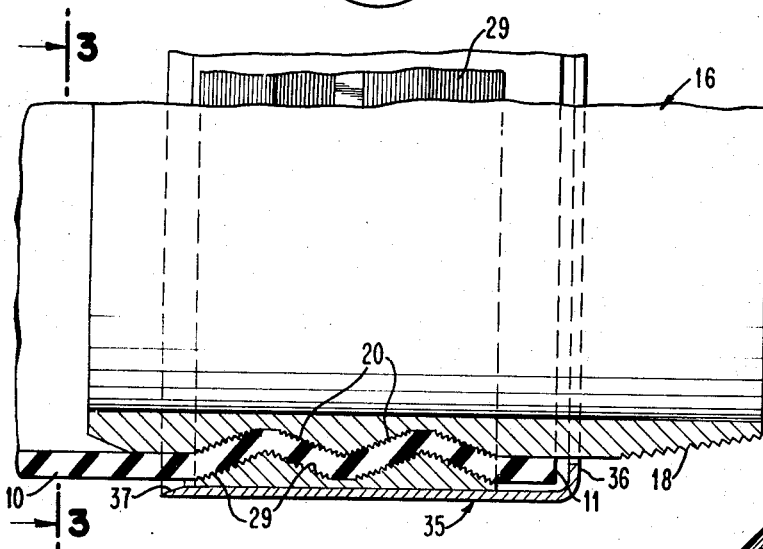
FIG. 2 is an enlarged fragmentary view of the hose and coupling illustrated in FIG. 1, but showing the coupling in position gripping the hose.
Figure 3:
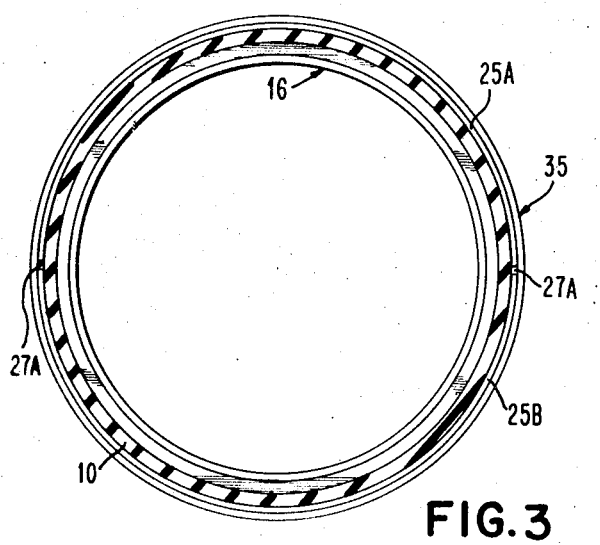
FIG. 3 is a sectional view taken along line 3—3 of FIG. 2, and as if FIG. 2 were not fragmentized and in section.
Figure 4:
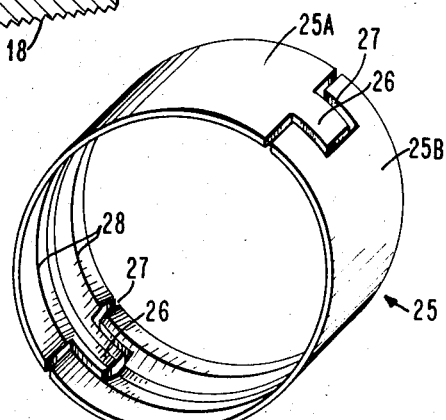
FIG. 4 is a perspective view of a portion of the novel coupling shown in FIGS. 1-3.

In order to grip the hose to the nipple, a floating collar 25 is provided for radial inward circumferential engagement of the hose against the nipple. In the present instance the collar is segmented or divided into first and second halves 25A, 25B, respectively (see FIG. 4) and adapted for axial and circumferential alignment as by tongues 26 on the half 25A and slots 27 on the half 25B, although any alignment means may be utilized. As shown in the drawings, the collar 25 includes circumferentially extending projections 28 having leading and trailing ramp portions 28A, 28B respectively, the ramp portions of the collar being adapted for superimposed mating engagement with the portion of the hose overlying the recesses 19 of the nipple 16, the axial length of the projections being substantially equal to the axial length of the recesses in the nipple. Additionally, each segment of the floating collar 25 is dimensioned such that some circumferential spacing 27A is effected when the segments are in the position so that the projections are pressing the hose into the recesses of the nipple. (See FIG. 3) In a like manner, and as best shown in FIGS. 2 and 4, the ramps 28A and 28B of the collar 25 are serrated as at 29.

Figure 1A:
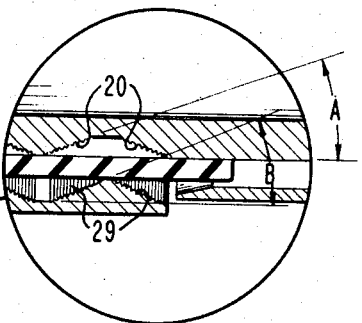
FIG. 1A is an enlarged fragmentary sectional view of a portion of the hose and coupling illustrated in FIG. 1.

In order to prevent axial disengagement of the collar 25 from the hose 10, a ferrule 35 is slipped over the collar 25 to circumferentially engage the same, the ferrule including an in-turned edge or shoulder 36 spaced from the terminal end 11 of the hose 10 and a tapered trailing portion 37 so as to effect a wedging action when positioning the ferrule to circumscribe the collar 25. [As shown in FIG. 1A, for purposes which once again will become clear hereinafter, the leading and trailing ramp portions of the recesses 19 form an angle A with the axis of the nipple.]

In order to increase the holding power of the collar against the nipple and thus the hose, it is preferable that the slope B of the ramp of the collar be slightly greater than the slope A of the ramps associated with the nipple, this action causing a slightly greater compression of the hose where the highest point of the projections 28 mate with the lowest points of the recesses 19, this action creating a spreading of the load effect on the hose helping to prevent cutting of the hose or sudden stressing of re-enforcing fibers upon high impact hydraulic loads on the interior of the hose.

As may be noted, the collar 25 is only restrained in the radial direction and therefore it is free to float in the axial direction upon hydraulic stressing of the hose. Thus, as hydraulic pressure, for example assuming flow to be towards the right in FIG. 2, attempts to force the nipple to the right, increased loading of the trailing ramps 19B and 28B respectively of the recesses and projections occurs. Additionally, in instances where the wall thickness of the hose is not overly thick, as the internal diameter from peak to peak of the projections is less than the internal diameter of the hose, the hose at the ramp portions tends to be compressively loaded eventhough some shear action is effected. As is readily apparent, the serrations or roughened portions 20 and 29 of the recesses and projections cooperate to cause gripping of the hose surfaces both internal and external thereby aiding gripping of the hose between the collar and the nipple.

Because of its design, the coupling may be easily attached to the hose as by first inserting the nipple into the hose, then placing the collar segments together circumscribing the hose and the nipple. The segments are brought together to clamp the hose to the nipple either by hand (if the hose wall is not overly thick) or by pliers or clamps, and the ferrule is then slipped in place until the in-turned edge 36 is spaced a short distance from the terminal end 11 of the hose.

As is readily apparent from the foregoing, the hose coupling of the present invention is self-tightening with a gradual self-tightening effect being accomplished by the difference in slope of the ramps associated with the nipple and collar. Additionally, the hose, by the construction of the coupling, is to a large part under compression loading (although some shear loading is still evident) while the coupling is easily assembled to the hose.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. A hose coupling comprising a nipple for insertion into a hose, said nipple having circumferentially extending recesses, and projections; a segmented, axially floating collar having circumferentially extending corresponding projections and recesses on the interior thereof adapted to circumscribe the nipple the projections on said nipple and said collar, when operatively assembled overlying, engaging and pressing the hose into said recesses; and a retaining ferrule adapted to circumferentially engage said floating collar to prevent radial disengagement of said collar from said hose, said projections of said nipple interfering in axially spaced relation with the projections on said collar while permitting relative axial movement between said collar and said nipple upon the application of hydraulic pressure in said coupling.

2. A hose coupling in accordance with claim 1 said nipple including leading and trailing ramp portions in said recesses.

3. A hose coupling in accordance with claim 2 wherein said ramp portions include serrated surface portions thereon.

4. A hose coupling in accordance with claim 2 wherein said segmented collar includes leading and trailing ramp portions adapted for cooperation in superimposed overlying relation with respective ramps of said nipple.

5. A hose coupling in accordance with claim 4 wherein said leading and trailing ramp portions of said collar include a roughened surface.

6. A hose coupling in accordance with claim 4 wherein the slope of the ramps associated with said collar are greater than the slope of the ramps associated with said nipple.

7. A hose coupling in accordance with claim 4 wherein said ramps of said collar and said nipple are serrated.

8. A hose coupling in accordance with claim 1 wherein said nipple includes leading and trailing ramp portions defining said recesses; said segmented collar including leading and trailing ramp portions adapted for cooperation in superimposed overlying relation with respective ramps of said nipple, the slope of said ramps of said collar being greater than the slope of the ramps associated with said nipple, the diameter of said collar at its innermost projection being less than the diameter of hose engageable by said nipple and collar.

9. A hose coupling in accordance with claim 1 wherein said retaining ferrule includes an in-turned shoulder at the leading edge thereof adapted to be axially spaced from the terminal end of said hose.

10. A hose coupling in accordance with claim 9 wherein said ferrule includes a tapered trailing portion to effect a wedging action against said collar when said ferrule is positioned to circumscribe said collar.

11. A hose coupling comprising a nipple for insertion into a hose, said nipple having circumferentially extending recesses and projections; a segmented, axially floating collar having circumferentially extending corresponding projections and recesses on the interior thereof to circumscribe the nipple, the projections on said nipple and said collar, when operatively assembled, overlying, engaging and pressing the hose into said recesses; and means to prevent radial disengagement of said floating collar from said hose said projections of said nipple interfering in axially spaced relation with the projections of said collar while permitting axial movement of said collar relative to said nipple.

12. A hose coupling in accordance with claim 11 including leading and trailing ramp portions in said recesses, and leading and trailing ramp portions in said collar, said ramp portions of said collar adapted for cooperation in superimposed overlying relation with respective ramps of said nipple.

13. A hose coupling in accordance with claim 12 wherein the slope of at least some of the ramps associated with said collar are greater than the slope of corresponding ramps associated with said nipple.

* * * * *

PO-1050
(5/69)

UNITED STATES PATENT OFFICE
CERTIFICATE OF CORRECTION

Patent No. 3,687,491      Dated August 29, 1972

Inventor(s) Don J. Marshall

It is certified that error appears in the above-identified patent and that said Letters Patent are hereby corrected as shown below:

In the claims:

Claim 1, line 6: After "nipple" insert -- , --

Claim 11, line 10: After "hose" insert -- , --

Signed and sealed this 15th day of May 1973.

(SEAL)
Attest:

EDWARD M. FLETCHER, JR.
Attesting Officer

ROBERT GOTTSCHALK
Commissioner of Patents